United States Patent
Levesque et al.

(10) Patent No.: US 9,946,336 B2
(45) Date of Patent: Apr. 17, 2018

(54) SYSTEMS AND METHODS FOR VIEWPORT-BASED AUGMENTED REALITY HAPTIC EFFECTS

(71) Applicant: Immersion Corporation, San Jose, CA (US)

(72) Inventors: Vincent Levesque, Montreal (CA); Danny Grant, Laval (CA)

(73) Assignee: Immersion Corporation, San Jose, CA (US)

( * ) Notice: Subject to any disclaimer, the term of this patent is extended or adjusted under 35 U.S.C. 154(b) by 0 days.

(21) Appl. No.: 15/600,141

(22) Filed: May 19, 2017

(65) Prior Publication Data

US 2017/0255255 A1 Sep. 7, 2017

Related U.S. Application Data

(63) Continuation of application No. 14/269,357, filed on May 5, 2014, now Pat. No. 9,690,370.

(51) Int. Cl.
*G06F 3/01* (2006.01)
*G06T 19/00* (2011.01)
*G06F 1/16* (2006.01)

(52) U.S. Cl.
CPC ............. *G06F 3/011* (2013.01); *G06F 3/016* (2013.01); *G06T 19/006* (2013.01); *G06F 1/163* (2013.01)

(58) Field of Classification Search
CPC ........ G06T 19/006; G06F 3/011; G06F 3/016; G06F 1/163; H04N 5/247
See application file for complete search history.

(56) References Cited

U.S. PATENT DOCUMENTS

| 7,376,903 B2 | 5/2008 | Morita et al. |
| 8,508,469 B1 | 8/2013 | Rosenberg et al. |
| 9,030,411 B2 | 5/2015 | Itkowitz et al. |

(Continued)

FOREIGN PATENT DOCUMENTS

| CN | 101387908 A | 3/2009 |
| CN | 102713805 A | 10/2012 |

(Continued)

OTHER PUBLICATIONS

European Patent Office Application No. 15166146.9, Office Action dated May 18, 2017, 7 pages.

(Continued)

*Primary Examiner* — Abbas Abdulselam
(74) *Attorney, Agent, or Firm* — Kilpatrick Townsend & Stockton LLP

(57) ABSTRACT

One illustrative system disclosed herein includes a display configured to receive a display signal and output an image, and an image capture device configured to capture an area image and transmit an image signal. The illustrative system also includes a processor in communication with the image capture device and the display, the processor configured to: receive the image signal; determine a virtual object based in part on the image signal; determine the display signal based in part on the image signal, wherein the display signal includes data associated with the virtual object; determine a haptic effect based at least in part on the virtual object; and transmit a haptic signal associated with the haptic effect. The illustrative system further includes a haptic output device configured to receive the haptic signal and output the haptic effect.

20 Claims, 7 Drawing Sheets

(56) References Cited

U.S. PATENT DOCUMENTS

| | | |
|---|---|---|
| 9,268,410 B2 | 2/2016 | Kasahara |
| 2004/0189675 A1 | 9/2004 | Pretlove et al. |
| 2006/0017654 A1 | 1/2006 | Romo |
| 2007/0035511 A1 | 2/2007 | Banerjee et al. |
| 2008/0059131 A1 | 3/2008 | Tokita et al. |
| 2009/0195538 A1 | 8/2009 | Ryu et al. |
| 2010/0053151 A1 | 3/2010 | Marti et al. |
| 2010/0141409 A1 | 6/2010 | Choi et al. |
| 2011/0121953 A1 | 5/2011 | Grant et al. |
| 2011/0279249 A1 | 11/2011 | Kipman et al. |
| 2011/0310227 A1 | 12/2011 | Konertz et al. |
| 2012/0139828 A1 | 6/2012 | Lok et al. |
| 2013/0002425 A1 | 1/2013 | Hatch et al. |
| 2013/0100008 A1 | 4/2013 | Stefan et al. |
| 2013/0314303 A1 | 11/2013 | Osterhout et al. |
| 2013/0328762 A1 | 12/2013 | McCulloch et al. |
| 2014/0176432 A1 | 6/2014 | Park et al. |
| 2014/0198130 A1 | 7/2014 | Lacroix et al. |
| 2014/0266647 A1 | 9/2014 | Visitacion et al. |
| 2015/0015607 A1 | 1/2015 | Sodhi et al. |
| 2015/0262428 A1 | 9/2015 | Tatzgern et al. |

FOREIGN PATENT DOCUMENTS

| | | |
|---|---|---|
| EP | 1 916 592 | 4/2008 |
| EP | 2 034 390 | 3/2009 |
| JP | 2002-082751 A | 3/2002 |
| JP | 2003-316493 A | 11/2003 |
| JP | 2009-069918 A | 4/2009 |
| JP | 2010-020526 A | 1/2010 |
| JP | 2010-537302 A | 12/2010 |
| WO | WO 2013/085639 | 6/2013 |

OTHER PUBLICATIONS

State Intellectual Property Office of the Peoples Republic of China Application No. 201410018078.6, Office Action dated Aug. 30, 2017, 10 pages.

Japanese Patent Office Application No. 2014-001010, Non-Final Office Action dated Aug. 29, 2017, 6 pages.

European Patent Office, Extended European Search Report, Application No. 14151258 dated Nov. 29, 2016.

European Patent Office, Extended European Search Report, Application No. 15166146 dated Sep. 17, 2015.

United States Patent and Trademark Office, Office Action, U.S. Appl. No. 13/741,826 dated Aug. 27, 2014.

United States Patent and Trademark Office, Office Action, U.S. Appl. No. 13/741,826 dated Mar. 5, 2015.

United States Patent and Trademark Office, Appeal Brief, U.S. Appl. No. 13/741,826 dated Oct. 5, 2015.

United States Patent and Trademark Office, Examiners Answer to Appeal Brief, U.S. Appl. No. 13/741,826 dated Feb. 26, 2016.

United States Patent and Trademark Office, Patent Board Decision, U.S. Appl. No. 13/741,826 dated Jan. 25, 2017.

Merrill, David and Maes, Pattie, "Augmenting Looking, Pointing and Reaching Gestures to Enhance the Searching and Browsing of Physical Objects", 2007, Springer-Verlag, "Proceedings of the 5th International Conference on Pervasive Computing", pp. 1-18, Retrieved from internet: <URL: http://dl.acm.org/citation.cfm?id=1758156.1758158>.

Stinson, L., So Smart: New Ikea App places Virtual Furniture in your Home, Wired, web page at https://www.wired.com/2013/08/a-new-ikea-app-lets-you-place-3d-furniture-in-your-home, as available via the Internet and dated Aug. 20, 2013.

The Future of Augmented Reality is in our Hands with Haptics & Touch Screens, Augmented Stories, Jan. 19, 2012, web page at http://augmentedstories.wordpress.com/2012/01/19/haptics/, as available via the Internet.

Electrostatic Vibration, Disney Research, web page at http://www.disneysearch.com/project/teslatouch/, as available via the Internet and printed Aug. 4, 2014.

Ikea app projects virtual furniture into your living room, The Verge, Aug. 9, 2013, web page at http://www.theverge.com/2013/8/9/4604816/ikea-catalog-augmented-reality-2014, as available via the Internet and printed Aug. 5, 2014.

colAR Mix 3D Coloring App, web page at http://www.colarapp.com, as available via the Internet and printed Aug. 5, 2014.

U.S. Appl. No. 13/741,826, Final Office Action dated Nov. 16, 2017, 36 pages.

SYSTEMS AND METHODS FOR VIEWPORT-BASED AUGMENTED REALITY HAPTIC EFFECTS

CROSS REFERENCE TO RELATED APPLICATIONS

This application is a continuation of and claims priority to U.S. patent application Ser. No. 14/269,357, filed May 5, 2014 and entitled "Systems and Methods for Viewport-Based Augmented Reality Haptic Effects," the entirety of which is incorporated herein by reference.

FIELD OF THE INVENTION

The present invention relates to the field of user interface devices. More specifically, the present invention relates to viewport-based augmented reality haptic effects.

BACKGROUND

As computer-based systems become more prevalent, the quality of the interfaces through which humans interact with these systems is becoming increasingly important. One common type of user interface is an augmented reality user interface. Augmented reality interfaces typically allow users to view, via a display, camera data that has been supplemented ("augmented") with virtual content. This virtual content may include text, images, or sounds, which may provide a user with additional information about aspects of the scene associated with the camera data. Augmented reality interfaces may be improved by including haptic capability.

SUMMARY

Embodiments of the present disclosure comprise computing devices comprising viewport-based augmented reality haptic effects. In one embodiment, a system of the present disclosure may comprise a display configured to receive a display signal and output an image, and an image capture device (e.g., a camera) configured to capture an area image and transmit an image signal. The system may also comprise a processor in communication with the image capture device and the display, the processor configured to: receive the image signal; determine a virtual object based in part on the image signal; determine the display signal based in part on the image signal, wherein the display signal comprises data associated with the virtual object; determine a haptic effect based at least in part on the virtual object; and transmit a haptic signal associated with the haptic effect. The system may further comprise a haptic output device configured to receive the haptic signal and output the haptic effect.

In another embodiment, a method of the present disclosure may comprise: receiving an image signal, wherein the image signal comprises an area image; determining a virtual object based in part on the image signal; determining a display signal based in part on the image signal, wherein the display signal comprises data associated with the virtual object; and transmitting the display signal to a display, wherein the display is configured to output an image. The method may further comprise determining a haptic effect based at least in part on the virtual object; transmitting a haptic signal associated with the haptic effect to a haptic output device; and outputting the haptic effect. Yet another embodiment comprises a computer-readable medium for implementing such a method.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Figure 1:
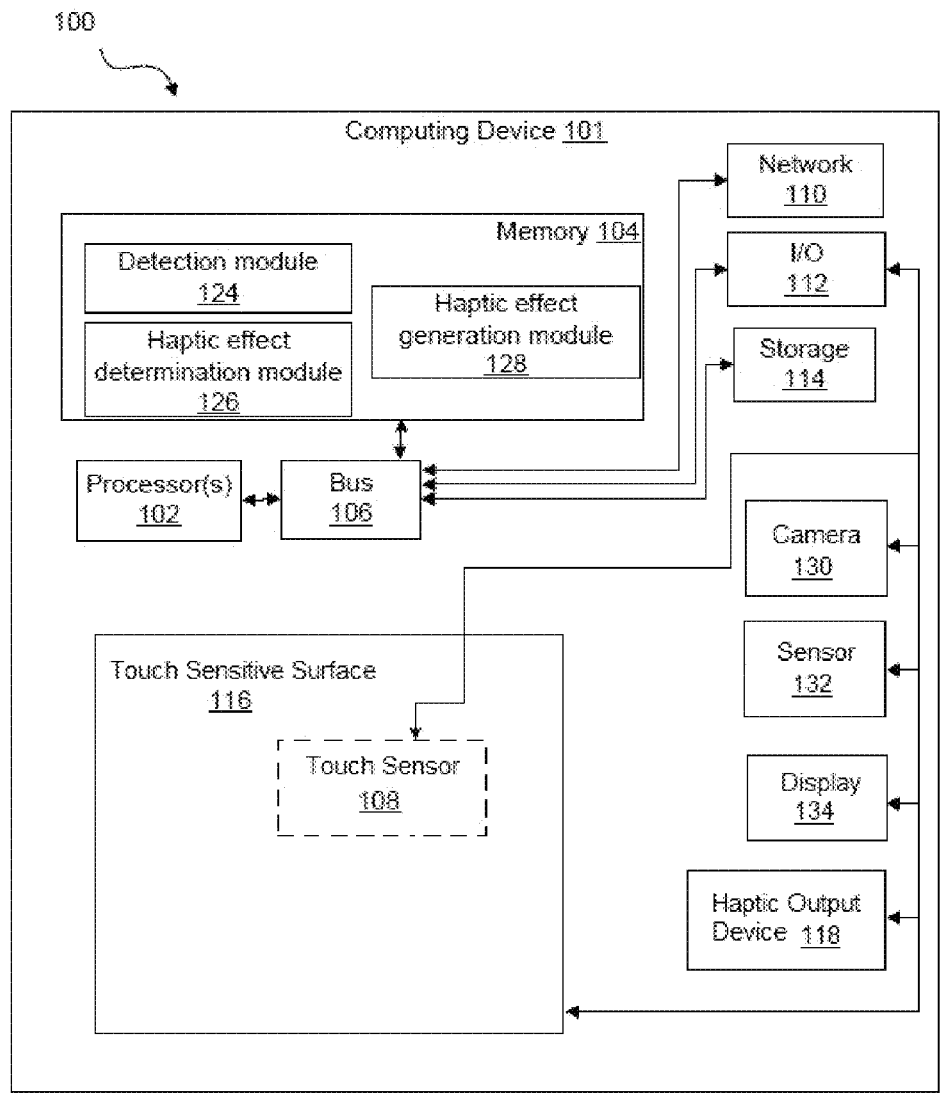
FIG. 1 is a block diagram showing a system for viewport-based augmented reality haptic effects according to one embodiment.

Reference will now be made in detail to various and alternative illustrative embodiments and to the accompanying drawings. Each example is provided by way of explanation and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Examples of Viewport-Based Augmented Reality Haptic Effects

One illustrative embodiment of the present disclosure comprises a mobile device, such as a smartphone. The mobile device comprises a touch screen display, a memory, a camera, and a processor in communication with each of these elements. The touch screen display comprises a viewport. A viewport comprises a region of a screen where data (e.g., text or images) is displayed. In some embodiments, the viewport may comprise the entire area of the screen.

In the illustrative embodiment, the mobile device also comprises an augmented reality application. Augmented reality applications output, via a display, camera data that has been supplemented ("augmented") with virtual content, such as text or images. The virtual content may either be static or animated. In the illustrative embodiment, a user may execute the augmented reality application and use a camera of the mobile device to capture an image with the mobile device. For example, the user may orient the mobile device so that the camera captures an image of a room of a house. In such an embodiment, the augmented reality application receives image data from the camera and outputs this data to the touch-screen display. In some embodiments, this image data may be updated in real time, e.g., the augmented reality application may continue to receive updated image data from the camera. In some embodiments, the user may perceive the camera data as if the user is looking through the display.

In the illustrative embodiment, the user may select a virtual object to include in the augmented reality application. For example, the user may select a virtual object associated with a piece of furniture from a catalogue associated with the augmented reality application. In such an embodiment, the augmented reality application generates a graphical representation of the furniture in the touch screen display. For example, the augmented reality application may generate a three-dimensional (3D) virtual representation of the furniture allowing the user to view, via the touch-screen display, the furniture in a room. Further, in the illustrative embodiment, the user may use the application to view virtual object (e.g., the image of the furniture) in different locations and with different orientations, scales, and colors. Thus, in the illustrative embodiment, a designer, distributor, retailer, or other seller may provide an augmented reality application and catalog to allow users to select and view items prior to purchase. In other embodiments, augmented reality applications may be used to provide users with additional information (e.g., address, pricing information, historical information, educational information, or reviews) about, for example, a company, product, or location; and/or add, modify, or remove objects (e.g., people, animals, buildings, landscape features, automobiles) from a scene captured by a camera.

In the illustrative embodiment, the user may make changes to the image or the virtual object by making gestures on the touch screen (e.g., a finger swipe or contacting an object displayed on the touch-screen). As discussed above, in the illustrative embodiment, the augmented reality application layers the virtual object over the camera's data. In the illustrative embodiment, by changing the orientation of the device or by making gestures on the touch-screen display, the user may alter the location, orientation, scale, color, or other factors associated with the virtual object. This may allow the user to perceive the virtual object in place in various locations (e.g., how a piece of furniture may look in various rooms).

In the illustrative embodiment, the mobile device further comprises a haptic output device. The haptic output device receives a signal from the mobile device and outputs a haptic effect to the user. In the illustrative embodiment, the haptic effect may comprise a simulated texture, a vibration, or a perceived change in a coefficient of friction. Further, in the illustrative embodiment, the haptic output device outputs haptic effects that are remote from the mobile device (hereinafter "remote haptic effects"). For example, the haptic output device may output a remote haptic effect by emitting a concentrated pressure wave in the direction of the user, or by emitting a solid, liquid, or gas from a jet at the user. Alternatively, in some embodiments the haptic output device may be separate from the mobile device. For example, the haptic output device may be associated with a wearable article, (e.g., a sleeve, a watch, a bracelet, an article of clothing, a jacket, glasses, a glove, a ring, a headband, a hat, or a shoe) and communicatively coupled to the mobile device (e.g., via a network connection, Bluetooth connection, or some other wired or wireless connection).

In the illustrative embodiment, the mobile device is configured to output a haptic effect, via the haptic output device, upon the occurrence of an event. An event, as used herein, is any interaction, action, collision, or other event which occurs during operation of the device which can potentially comprise an associated haptic effect. In the illustrative embodiment, an event comprises the presence of a virtual object (e.g., the presence of a virtual furniture piece), an interaction with the mobile device (e.g., tilting or moving the mobile device, interacting with the touch screen display), a change in status in the mobile device, receiving data, sending data, program activity (e.g., game activity), interacting with a virtual object, movement of a virtual object (e.g., moving or bouncing of a virtual object), and/or a change in scale, location, orientation, color, or other characteristic of a virtual object.

For example, in the illustrative embodiment, the mobile device outputs an effect when the user interacts with a virtual object (e.g., by touching the location associated with a virtual piece of furniture or touching an area in real space associated with the virtual object), or makes a gesture on the surface of the touch screen display (e.g., to change the color, size, or orientation of the virtual furniture piece). Further, the haptic effect may be associated with the virtual object. For example, in the illustrative embodiment, when the user interacts with the location of the touch screen associated with the virtual furniture, the mobile device determines a haptic effect associated with a material associated with the virtual furniture (e.g., wood, glass, metal, or plastic) and outputs a haptic effect associated with one or more of those materials (e.g., a haptic effect configured to simulate the texture of the material to the user). As another example, in the illustrative embodiment, if the user touches an area in real space associated with a piece of virtual furniture, the mobile device outputs a remote haptic effect comprising, for example, a puff of air emitted to the back of the user's hand. The user may perceive the remote haptic effect as if the user is interacting with the virtual object in real space.

The description of the illustrative embodiment above is provided merely as an example. Various other embodiments of the present invention are described herein and variations of such embodiments would be understood by one of skill in the art. Advantages offered by various embodiments may be further understood by examining this specification and/or by practicing one or more embodiments of the claimed subject matter.

Illustrative Systems for Viewport-Based Augmented Reality Haptic Effects

FIG. 1 is a block diagram showing a system 100 for viewport-based augmented reality haptic effects according to one embodiment. In the embodiment shown, system 100 comprises a computing device 101 having a processor 102 in communication with other hardware via bus 106. Computing device 101 may comprise, for example, a smartphone, tablet, e-reader, laptop computer, portable gaming device, a head-mounted display, or glasses.

A memory 104, which can comprise any suitable tangible (and non-transitory) computer-readable medium such as RAM, ROM, EEPROM, or the like, embodies program components that configure operation of the computing device 101. In the embodiment shown, computing device 101 further includes one or more network interface devices 110, input/output (I/O) interface components 112, and storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate wired or wireless connection to devices such as one or more displays 134, game controllers, keyboards, mice, joysticks, cameras, buttons, speakers, microphones, and/or other hardware used to input data or output data. Storage 114 represents non-volatile storage such as magnetic, optical, or other storage media included in device 101 or coupled to processor 102.

System 100 further includes a touch sensitive surface 116, which, in this example, is integrated into computing device 101. Touch sensitive surface 116 represents any surface that is configured to sense tactile input of a user. One or more touch sensors 108 are configured to detect a touch in a touch area when an object contacts a touch sensitive surface 116 and provide appropriate data for use by processor 102. Any suitable number, type, or arrangement of sensors can be used. For example, resistive and/or capacitive sensors may be embedded in touch sensitive surface 116 and used to determine the location of a touch and other information, such as pressure, speed, and/or direction. As another example, optical sensors with a view of the touch sensitive surface 116 may be used to determine the touch position.

In other embodiments, the touch sensor 108 may comprise a LED detector. For example, in one embodiment, touch sensitive surface 116 may comprise a LED finger detector mounted on the side of a display 134. In some embodiments, the processor 102 is in communication with a single touch sensor 108, in other embodiments, the processor 102 is in communication with a plurality of touch sensors 108, for example, a first touch-screen and a second touch screen. The touch sensor 108 is configured to detect user interaction, and based on the user interaction, transmit signals to processor 102. In some embodiments, touch sensor 108 may be configured to detect multiple aspects of the user interaction. For example, touch sensor 108 may detect the speed and pressure of a user interaction, and incorporate this information into the interface signal.

Touch sensitive surface 116 may or may not comprise (or otherwise correspond to) a display 134, depending on the particular configuration of the system 100. Some embodiments include a touch enabled display that combines a touch sensitive surface 116 and a display 134 of the device. The touch sensitive surface 116 may correspond to the display 134 exterior or one or more layers of material above the actual display 134 components. In other embodiments, the computing device 101 comprises a touch sensitive surface 116 which may be mapped to a graphical user interface provided in a display 134 that is included in system 100 interfaced to computing device 101.

Further, system 100 comprises a camera 130. Although the camera 130 is depicted in FIG. 1 as being internal to computing device 101, in some embodiments, the camera 130 may be external to and in communication with computing device 101. For example, camera 130 may be external to and in communication with computing device 101 via wired interfaces such as Ethernet, USB, IEEE 1394, and/or wireless interfaces such as IEEE1 802.11, Bluetooth, or radio interfaces. Camera 130 is configured to capture one or more images of an area (hereinafter be referred to as an "area image"). An area image comprises an image of a space and/or one or more objects within the space, e.g., an indoor area such as a room in a house or the inside of a store, or an outdoor area such as a park or street. Camera 130 is further configured to transmit a camera 130 signal associated with the images to the processor 102. Further, in some embodiments, the system 100 may comprise a plurality of cameras 130. In some embodiments, the processor 102 may determine an image and/or display signal to output to the display 134 based on signals from one or more cameras 130. For example, in some embodiments, the processor 102 may determine an image to output to the display 134 comprising a 3D representation of a scene based on signals from a plurality of cameras 130.

In the embodiment shown, computing device 101 comprises one or more additional sensors 132. In some embodiments, the sensor 132 may comprise, for example, a gyroscope, an accelerometer, a global positioning system (GPS) unit, a range sensor, or a depth sensor. In some embodiments, the gyroscope, accelerometer, and GPS unit may detect an orientation, acceleration, and location of computing device 101, respectively. In some embodiments, the camera, range sensor, and/or depth sensor may detect a distance between computing device 101 and an external object (e.g., a user's hand, head, arm, foot, or leg; another person; an automobile; a tree; a building; or a piece of furniture). In some embodiments, computing device 301 may generate a virtual object with properties based on this distance (e.g., the orientation, color, scale, or location). In some embodiments, the processor 102 may be in communication with a single sensor 132 and, in other embodiments, the processor 102 may be in communication with a plurality of sensors 132, for example, a gyroscope and an accelerometer. The sensor 132 is configured to transmit a sensor 132 signals to processor 102.

System 100 further includes haptic output device 118 in communication with processor 102. Haptic output device 118 is configured to output an effect in response to a haptic signal. In some embodiments, haptic output device 118 is configured to output a haptic effect comprising, for example, a vibration, a change in a perceived coefficient of friction, a simulated texture, a surface deformation, and/or a puff of a solid, liquid, or gas.

In some embodiments, haptic output device 118 may output a haptic effect by vibrating the computing device 101 or a component of computing device 101, e.g., touch sensitive surface 116 or display 134. In such embodiments, haptic output device 118 may comprise a haptic output device configured to output a vibration, e.g., one or more of a piezoelectric actuator, an electric motor, an electro-magnetic actuator, a voice coil, a shape memory alloy, an electro-active polymer, a solenoid, an eccentric rotating mass motor (ERM), or a linear resonant actuator (LRA).

In some embodiments, haptic output device 118 may be configured to output remote haptic effects. In some embodiments, haptic output device 118 may comprise, for example, speakers or jets that emit materials such as solids, liquids, gasses, or plasmas from the computing device 101 to the user. In some embodiments, haptic output device 118 may use a plurality of ultrasonic transducers to emit a concentrated pressure wave toward the user.

In some embodiments, haptic output device 118 may output a haptic effect via a surface that a user may be contacting. For example, in some embodiments, the computing device 101 may be positioned on surface (e.g., a floor, desk, chair, or table) that a user may be contacting. The haptic output device 118 may output a haptic effect by vibrating, moving, tilting, or deforming the surface. For example, in some embodiments, the computing device 101 may be positioned on a table the user may be contacting. In some embodiments, the haptic output device 118 may output a haptic effect by vibrating the table. In some embodiments, the user may be able to perceive the haptic effect via the table.

In the embodiment shown in FIG. 1, haptic output device 118 is in communication with processor 102 and internal to computing device 101. In other embodiments, haptic output device 118 may be remote from computing device 101, but communicatively coupled to processor 102. For example, haptic output device 118 may be external to and in communication with computing device 101 via wired interfaces such as Ethernet, USB, IEEE 1394, and/or wireless interfaces such as IEEE 802.11, Bluetooth, or radio interfaces. In some embodiments, haptic output device 118 may be coupled to a wearable device that may be remote from the computing device 101. In some embodiments, the wearable device may comprise shoes, a sleeve, a jacket, glasses, a glove, a ring, a watch, a wristband, a bracelet, an article of clothing, a hat, a headband, and/or jewelry. The wearable device may be associated with a part of a user's body, for example, a user's finger, arm, hand, foot, leg, head, or other body part.

In some embodiments, the haptic output device 118 may be disposed within an object (not shown) external to computing device 101, for example, a box, wand, book, or smartphone. In some embodiments, the haptic output device 118 may output a haptic effect via the external object. For example, in some embodiments, the external object may determine (e.g., via Bluetooth or GPS) if the external object is within a certain distance (e.g., 1 m) from the computing device 101. In some embodiments, the external object may output a haptic effect via the haptic output device 118 if the external device is a certain distance (e.g., 1 m) from the computing device 101.

In some embodiments, haptic output device 118 may be configured to output a haptic effect simulating a texture or modulating the perceived coefficient of friction on the touch sensitive surface 116 in response to a haptic signal. In one such embodiment, haptic output device 118 may comprise an ultrasonic actuator. An ultrasonic actuator may vibrate at an ultrasonic frequency, for example 20 kHz, increasing or reducing the perceived coefficient at the surface of touch sensitive surface 116. Further, an ultrasonic actuator may comprise a piezo-electric material.

In other such embodiments, haptic output device 118 may use electrostatic attraction, for example by use of an electrostatic surface actuator, to output a haptic effect simulating a texture or modulating the perceived coefficient of friction on the touch sensitive surface 116. In such an embodiment, the electrostatic actuator may comprise a conducting layer and an insulating layer. The conducting layer may be any semiconductor or other conductive material, such as copper, aluminum, gold, or silver. The insulating layer may be glass, plastic, polymer, or any other insulating material. Furthermore, the processor 102 may operate the electrostatic actuator by applying an electric signal, for example, an AC signal generated by a high-voltage amplifier, to the conducting layer. The electric signal may, in some embodiments, capacitively couple the conducting layer with an object (e.g., a user's finger, head, foot, arm, shoulder, leg, or other body part, or a stylus) near or touching the touch sensitive surface 116. In some embodiments, varying the levels of attraction between the object and the conducting layer can vary the simulated texture on an object moving across the surface of the touch sensitive surface 116.

In some embodiments, haptic output device 118 may comprise a deformation device configured to output a haptic effect by deforming the surface of the touch sensitive surface 116 or another surface of computing device 101. In such an embodiment, haptic output device 118 may comprise a smart gel that responds to stimulus or stimuli by changing in stiffness, volume, transparency, and/or color. In some embodiments, stiffness may comprise the resistance of the touch sensitive surface 116 against deformation. In one such embodiment, one or more wires may be embedded in or coupled to the smart gel. As current runs through the wires, heat is emitted, causing the smart gel to expand or contract, deforming haptic output device 118. In other embodiments, haptic output device 118 may comprise an actuator coupled to an arm that rotates a deformation component. The actuator may comprise a piezo-electric actuator, rotating/linear actuator, solenoid, an electroactive polymer actuator, macro fiber composite (MFC) actuator, shape memory alloy (SMA) actuator, and/or other actuator. As the actuator rotates the deformation component, the deformation component may move the surface of haptic output device 118, causing it to deform. In some embodiments, haptic output device 118 may be a portion of the housing of touch sensitive surface 116. In other embodiments, haptic output device 118 may be housed inside a flexible housing overlaying touch sensitive surface 116.

Although a single haptic output device 118 is shown here, some embodiments may use multiple haptic output devices of the same or different type to provide haptic feedback. Some haptic effects may utilize an actuator coupled to a housing of the device, and some haptic effects may use multiple actuators in sequence and/or in concert. For example, in some embodiments, multiple vibrating actuators and gas jets can be used alone or in concert to provide different haptic effects.

Turning to memory 104, program components 124, 126, and 128 are depicted to show how a device can be configured in some embodiments to provide viewport-based augmented reality haptic effects. In this example, a detection module 124 configures processor 102 to monitor touch sensitive surface 116 via touch sensor 108 to determine a position of a touch. For example, module 124 may sample touch sensor 108 in order to track the presence or absence of a touch and, if a touch is present, to track one or more of the location, path, velocity, acceleration, pressure and/or other characteristics of the touch over time.

Haptic effect determination module 126 represents a program component that analyzes data to determine a haptic effect to generate. Particularly, haptic effect determination module 126 may comprise code that determines, based on the location of the touch on the touch sensitive surface 116, a haptic effect to output and code that selects one or more haptic effects to provide in order to simulate the effect. For example, different haptic effects may be selected based on the location of a touch in order to simulate the presence of a virtual object (e.g., a virtual piece of furniture, automobile, animal, cartoon character, button, lever, logo, or person) on the display 134. Further, in some embodiments, haptic effect determination module 126 may comprise code that determines, based on the size, color, location, movement, and/or other characteristics of a virtual object, a haptic effect to output and code that selects one or more haptic effects to provide in order to simulate the effect. For example, haptic effects may be selected based on the color of a virtual object (e.g., a strong vibration if the virtual object is red, and a weaker vibration if the virtual object is green).

In some embodiments, haptic effect determination module 126 may determine a haptic effect based on events. An event, as used herein, is any interaction, action, collision, or other event which occurs during operation of the device which can potentially comprise an associated haptic effect. In some embodiments, an event may comprise the presence of a virtual object (e.g., the presence of a virtual furniture piece), an interaction with the mobile device (e.g., tilting or moving the mobile device, or interaction with a touch sensitive surface 116), a change in status in the mobile device, receiving data, sending data, program activity (e.g., game activity), interacting with a virtual object, movement of a virtual object (e.g., moving or bouncing of a virtual object), and/or a change in scale, location, orientation, color, or other characteristic of a virtual object. For example, in some embodiments, the augmented reality application may comprise a game in which a user navigates a virtual avatar through a virtual space. In some embodiments, if the user's virtual avatar strikes an object in the virtual space (e.g., a furniture piece in a virtual representation of the user's home), the augmented reality application may determine a haptic effect configured to simulate a collision. For example, haptic effect determination module 126 may determine a haptic effect comprising a vibration with a magnitude proportional to the speed of impact between the avatar and the virtual object. That is, the higher the impact speed between the avatar and the virtual object, the higher the magnitude of the vibration.

In other embodiments, haptic effect determination module 126 may determine a haptic effect based at least in part on sensor signals received from sensor 132. Sensor 132 may comprise, for example, a camera or depth sensor. In some embodiments, processor 102 may receive sensor signals from sensor 132 and determine a distance between the computing device 101 and the user or a part of the user's body (e.g., hand or finger). Based on this determination, haptic effect determination module 132 may determine a remote haptic effect. For example, in one such embodiment, the processor 102 may determine a haptic effect that is output to the user's foot using a haptic output device configured to output a puff of air. In such an embodiment, processor 102 may receive sensor signals from sensor 132 and based on those signals determine the distance (e.g., 1 m) between the computing device 101 and the user's foot. The haptic effect determination module 126 may determine the haptic effect based at least in part on the determined distance.

Haptic effect generation module 128 represents programming that causes processor 102 to transmit a haptic signal to haptic output device 118 to generate the selected haptic effect. For example, haptic effect generation module 128 may access stored waveforms or commands to send to haptic output device 118. As another example, haptic effect generation module 128 may comprise algorithms to determine the haptic signal. Haptic effect generation module 128 may comprise algorithms to determine target coordinates for the haptic effect. These target coordinates may comprise, for example, a location on the touch sensitive surface 116.

Figure 2:
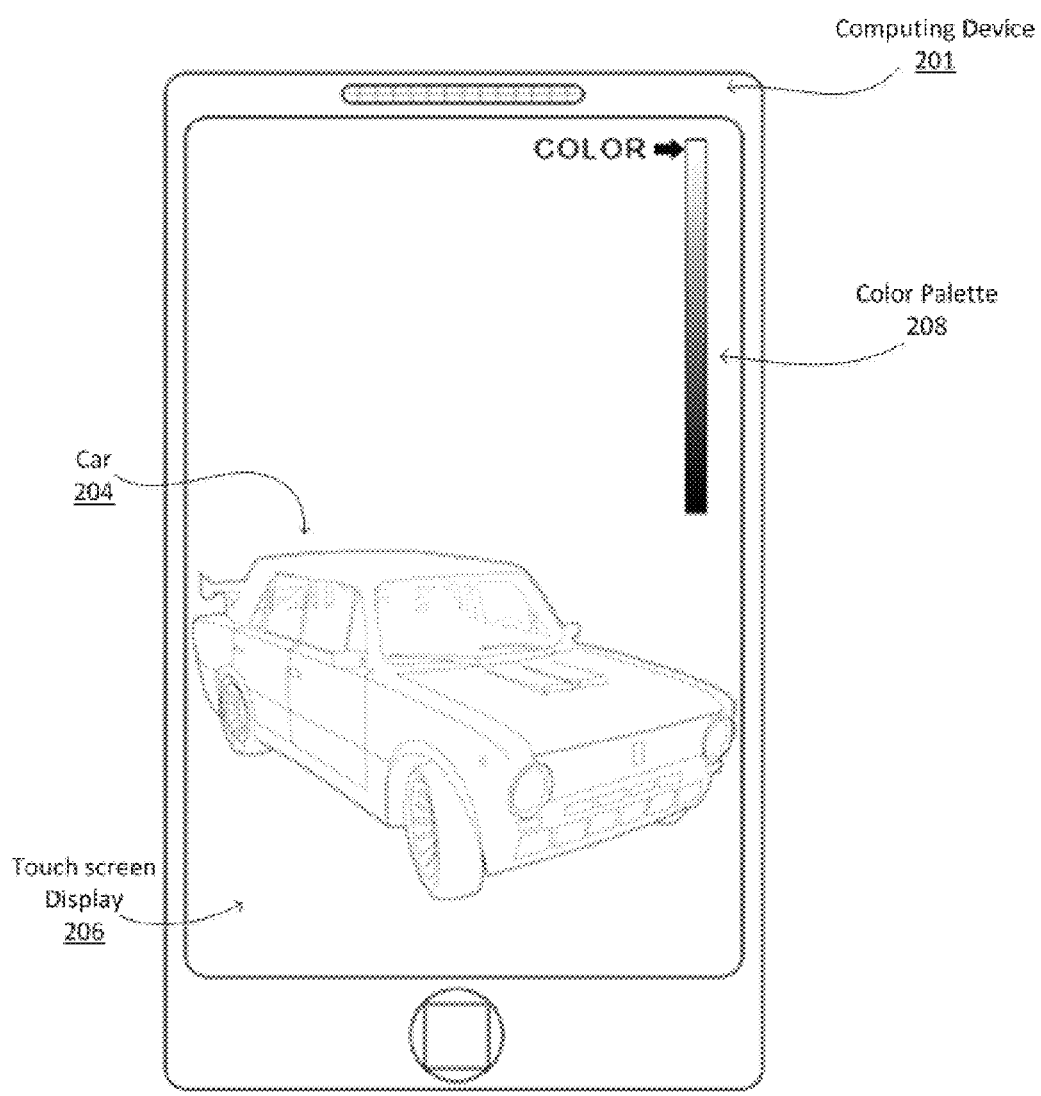
FIG. 2 shows an embodiment of a system for viewport-based augmented reality haptic effects.

FIG. 2 shows an embodiment of a system for viewport-based augmented reality haptic effects. In this example, the system comprises a computing device 201. In some embodiments, the computing device 201 may comprise a tablet, kiosk, smartphone, e-reader, laptop computer, desktop computer, portable gaming device, glasses, a head-mounted display, and/or other electronic devices. In the embodiment shown in FIG. 2, the computing device 201 comprises a touch screen display 206.

The computing device 201 further comprises a camera (not shown). In some embodiments, the camera may be internal to computing device 201. For example, the camera may be positioned on the front, back, or sides of computing device 201. In other embodiments, the camera may be external to computing device 201 and in wired or wireless communication with computing device 201. In still other embodiments, computing device 201 may comprise a plurality of cameras, which me be internal and/or external to computing device 201.

The computing device 201 comprises an augmented reality application. In the embodiment shown in FIG. 2, the augmented reality application allows a user to capture camera data and change the color of the objects associated with the camera data. For example, as shown in FIG. 2, the user may adjust the color of an object using the color palette 208.

As shown in FIG. 2, the user has oriented the computing device 201 to capture camera data associated with a car. The user may interact with the color palette 208 by, for example, sliding the user's finger or a stylus across the surface of the touch screen display 206 (e.g., with a swipe or two finger pinch). Further, in some embodiments, the user may interact with the color palette 208 by shaking, tilting, or otherwise moving computing device 201. In such embodiments, an accelerometer or gyroscope may detect the user interaction and transmit sensor signals associated with the user interaction to a processor.

Computing device 201 may determine and output a haptic effect based on the occurrence of an event. The event may comprise a passage of time; a change in color, scale, orientation, or location of a virtual object; or a user interaction with the computing device 201 (e.g., tilting or moving the computing device 201, interacting with the touch screen display 206, or interacting with other user interface devices such as buttons or joysticks). The haptic effect may comprise a vibration, a perceived change in a coefficient of friction, or a simulated texture. In some embodiments, the simulated texture may comprise metal, glass, plastic, wood, rubber, canvas, sand, gravel, cement, grass, and/or other textures. For example, in one embodiment, as a user places a finger over the location on the display 206 comprising the car 204, the computing device 201 outputs a haptic effect comprising a simulated metal texture. In another embodiment, the haptic effect may comprise a surface deformation, for example, raising or lowering a portion of the touch screen display 206. For example, in one embodiment, as a user places a finger over the location on the display 206 comprising the car 204, the computing device 201 outputs a haptic effect comprising a surface deformation in which the portion of the touch screen display 206 comprising the perimeter of the car is raised.

In some embodiments, computing device 201 may determine a haptic effect based at least in part on camera data (e.g., real-time or near real-time camera data). For example, in some embodiments, the computing device 201 may determine a haptic effect based on the data in the image captured by the camera. In one such embodiment, the computing device determines that the camera data comprises an image of a car and outputs an associated haptic effect. For example, the computing device may output a haptic effect (e.g., a vibration) configured to mimic the rumbling of a car engine. In some embodiments, this haptic effect may be output on a periodic basis (e.g., every two minutes).

In some embodiments, the computing device 201 may output haptic feedback based at least in part on data from other sensors (e.g., a GPS device, an accelerometer, a gyroscope, an inclinometer, a depth sensor, or a range detector). For example, in some embodiments, the processor may determine the haptic effect based in part on the user's location. In some embodiments, the user may capture an image of a car on the street. In such an embodiment, the computing device 201 may determine, via a GPS device, the user's location and display data associated with the car and the location. For example, the computing device 201 may provide a notification with the nearest car dealership carrying the car, as well as other information about the car (e.g., year, model, or price). In some embodiments, the computing device 201 may output a haptic effect associated with the car. For example, in one embodiment, the haptic effect comprises a vibration with a magnitude that is inversely proportional to the distance between the user and the car dealership.

As another example, in some embodiments, the user may capture an image of a restaurant. In such an embodiment, the computing device 201 may determine, via a GPS device, the user's location and display data associated with the restaurant. For example, the computing device may provide a notification with information about the restaurant (e.g., the owners, the menu, reservation options, restaurant hours, the website, the style of cuisine, or reviews). In some embodiments, the computing device 201 may output a haptic effect associated with the restaurant. For example, in one embodiment, the haptic effect comprises a vibration with a magnitude that is proportional to the review rating (out of five stars) of the restaurant.

In some embodiments, computing device 201 may analyze the camera's data and, based on this analysis, add virtual objects (e.g., people, animals, furniture, streets, gravel, sand, plants, buildings, carpets, insects, or vehicles) to the scene captured by the camera. For example, in some embodiments, computing device 201 may analyze the camera's data and determine that the scene captured by the camera includes a car 204. Based on this analysis, the computing device 201 may add a virtual object to the scene comprising, for example, a road underneath the car 206. In some embodiments, as a user moves a finger across the surface of the touch screen display 206 on the areas comprising the road, the computing device 201 may output a haptic effect comprising an increase in the perceived coefficient of friction on the surface of display 206. In other embodiments, the computing device 201 may add a virtual car to the scene, for example, so that the user may compare the car captured by the camera with other automobile makes or models. In some embodiments, as a user switches between virtual car models, for example by swiping a finger across the surface of the touch screen display 206, the computing device 201 may output a haptic effect comprising a vibration to confirm receipt of the user input. In some embodiments, the computing device 201 may add a virtual tree to the scene. In some embodiments, as a user moves a finger across the surface of the touch screen display 206 on the areas comprising the tree, the computing device 201 may output a haptic effect comprising a simulated texture associated with bark or leaves.

In some embodiments, computing device 201 may output sound, text, and/or video in addition to haptic effects based on the occurrence of an event and/or camera data. In some embodiments, the sound, text, and/or video may be associated with a virtual object. For example, upon the occurrence of an event (e.g., a user interacting with the virtual car), the computing device 201 may output a haptic effect and a sound (e.g., a horn honk).

Figure 3:
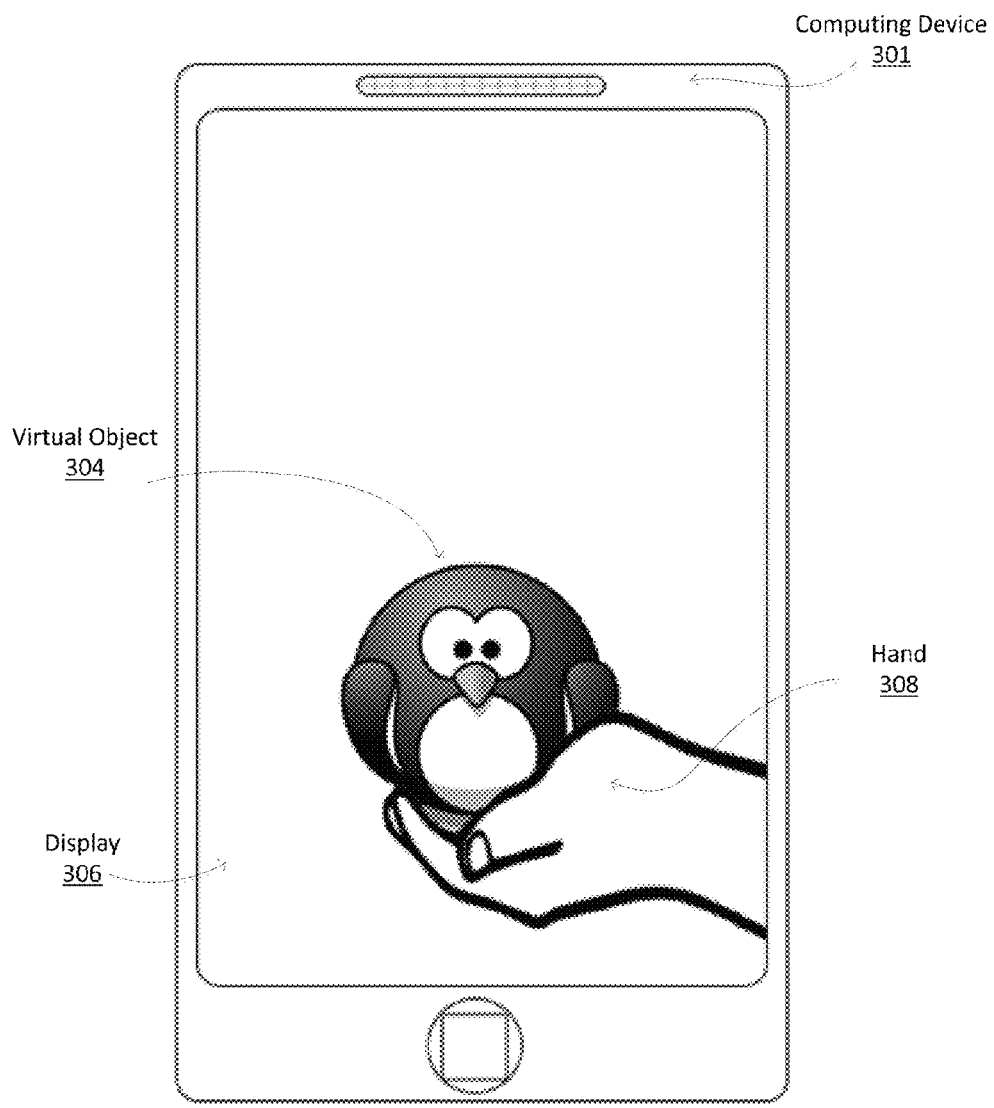
FIG. 3 shows another embodiment of a system for viewport-based augmented reality haptic effects.

FIG. 3 shows another embodiment of a system for viewport-based augmented reality haptic effects. In this example, the system comprises a computing device 301, which comprises a smartphone or tablet with a display 306.

Computing device 301 comprises a camera (not shown) positioned on the back of the computing device 301. Further, computing device 301 comprises an augmented reality application. The augmented reality application may output on the display 306 a virtual object 304, for example, a virtual hat, glasses, cartoon characters, automobiles, furniture, buttons, levers, buildings, plants, and/or animals. In some embodiments, the augmented reality application may place the virtual object 304 in one of various locations on the display 306, for example, in the corners or middle of the display, or in locations associated with the camera data (e.g., on top of a bookshelf, a car, a house, an animal, or person captured by the camera). Further, in some embodiments, the augmented reality application may alter the orientation, scale, color, and/or other characteristics of the virtual object 304 based on where the virtual object's 304 location in the display 306.

In the embodiment shown in FIG. 3, the augmented reality application generates a virtual object 304 on an object captured by the camera. For example, in the embodiment shown in FIG. 3, a user has placed a hand 308 within the view of the camera and the augmented reality application has generated a virtual object 304 comprising a virtual penguin on the user's hand.

In some embodiments, computing device 301 may output a haptic effect based on the virtual object 304 and/or the occurrence of an event. In some embodiments, the haptic effect may be based on the movement, color, location, orientation, scale, or presence of the virtual object 304. For example, in the embodiment shown in FIG. 3, the computing device 301 may output a haptic effect associated with movement of the virtual penguin, e.g., walking on the user's hand 308. In such an embodiment, as the virtual penguin takes steps, the computing device 301 may output a haptic effect, for example, vibrations through the housing of computing device 301.

Further, in some embodiments, computing device 301 may output a remote haptic effect. As discussed above, the remote haptic effect may comprise a haptic effect output remotely from the computing device 301, for example, by a puff of a solid, liquid, gas, or plasma from a jet, by a concentrated pressure wave from an array of ultrasonic transducers, or by a haptic output device coupled to a wearable device associated with a user's body part. For example, in some embodiments, the haptic effect may be associated with interactions between the virtual object 304 and the user. For example, in the embodiment shown in FIG. 3, as the virtual penguin moves on the user's right hand 308, computing device 301 may output a remote haptic effect directed at the user's hand 308. This remote haptic effect may comprise, e.g., an air puff or a concentrated pressure wave emitted toward the location on the user's hand 308 where the virtual object has "stepped." In such an embodiment, the user may perceive the puff of gas or concentrated pressure wave as if the virtual object 308 was actually contacting the user's hand 308. As another example, in some embodiments, the computing device 301 may comprise a front-facing camera. In some embodiments, the user may be able to use an augmented reality application to put a virtual object 304 (e.g., a superhero mask) on the user's body, for example, on the user's face. As a user manipulates a virtual object 304, the computing device 301 may output a remote haptic effect directed at the user's face. This remote haptic effect may comprise, for example, a gas puff or a concentrated pressure wave emitted toward the user's face. In such an embodiment, the user may perceive the puff of gas or concentrated pressure wave as if the virtual object 308 was actually contacting and/or moving across the user's face.

In some embodiments, the system may comprise a haptic output device remote from, but in communication with, computing device 301. For example, the haptic device may be coupled to a wearable device (e.g., shoes, a sleeve, a jacket, glasses, a glove, a ring, a watch, a bracelet, wristband, a headband, an article of clothing, a hat, and/or jewelry) associated with a part of a user's body (e.g., a user's finger, arm, hand, foot, leg, or head). The computing device 301 may output a remote haptic effect (e.g., a vibration) to the user via the remote haptic output device.

For example, in some embodiments, the user may wear a wearable device comprising one or more haptic output devices in communication with computing device 301. As a user manipulates a virtual object 304, the computing device 301 may output a remote haptic effect via the wearable device. For example, in some embodiments, the user may be wearing a headband comprising one or more haptic output devices. In some embodiments, the computing device 301 may comprise a front-facing camera, and the user may be able to use an augmented reality application to "try on" virtual articles of clothing. For example, in one such embodiment, the user may add a hat to the camera data associated with the user's head. As the user manipulates the virtual hat via the augmented reality application, the computing device 301 may output a remote haptic effect through headband (e.g., a vibration) in order to simulate the feeling of manipulating a hat on the user's head. In another embodiment, the user may be playing an augmented reality application comprising a video game. For example, the user may be playing a video game in which the user can shoot a wrist-mounted, futuristic virtual laser gun. The augmented reality application may add the virtual laser gun to the camera data associated with the user's wrist. In some embodiments, the user may perceive the virtual laser gun as if it is on the user's wrist. Further, the user may be wearing a wristband comprising one or more haptic output devices. As the user fires the virtual laser gun, the computing device 301 may output a remote haptic effect (e.g., a vibration) via the wristband. In some embodiments, the remote haptic effect may simulate the feeling of firing a laser gun.

Figure 4:
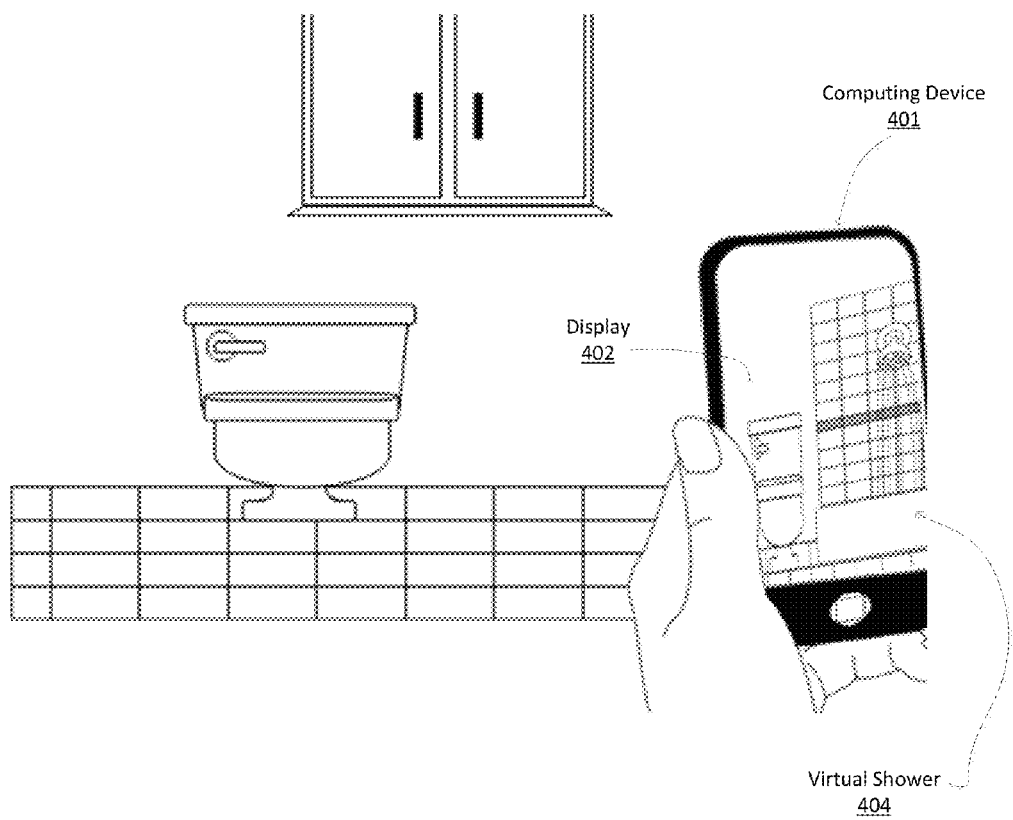
FIG. 4 shows a system for viewport-based augmented reality haptic effects according to one embodiment.

FIG. 4 shows a system for viewport-based augmented reality haptic effects according to one embodiment. In this example, the system comprises a computing device 401, which comprises a smartphone with a display 402. Computing device 401 further comprises a camera (not shown) positioned on the back of the computing device 401 and an augmented reality application. In the embodiment shown in FIG. 4, the augmented reality application is related to decorating or renovating. In some embodiments, such an application may allow a user to virtually add or remove walls from a room, change a room's wall color, and/or add or remove furniture to the room.

In the embodiment shown in FIG. 4, the user has pointed the camera toward a bathroom, and computing device 401 is outputting data from the camera associated with the bathroom on the display 402. In the embodiment shown in FIG. 4, an augmented reality application allows a user to add virtual furniture or fixtures to the bathroom. In this example, the user has chosen to add a virtual shower 404 to the user's bathroom.

In some embodiments, computing device 401 may output a different types of haptic effects based on the virtual object (e.g., the virtual shower 404) and/or in response to different events. For example, in one embodiment, a user may choose different tile for the virtual shower. Thereafter, if the user moves a finger across the display 402, computing device 401 outputs textures or changes in a perceived coefficient of friction associated with the tile on the surface of the display 402.

In some embodiments, the computing device 401 may detect the user's gestures in the area captured by the camera via one or more of a camera, depth sensor, and/or range sensor. In some embodiments, based on this data, the computing device may enable the user to interact with the area associated with a virtual object, e.g., the user may interact with the virtual shower's faucet. In such an embodiment, computing device 401 may output a remote haptic effect associated with the user interaction. For example, the computing device 401 may output a remote haptic effect comprising a puff of air at the back of the user's finger or by vibrating a haptically-enabled wearable device (e.g., a ring or watch). In some embodiments, this haptic feedback may confirm receipt of the input gesture or simulate an interaction with the virtual object. For example, in the embodiment shown in FIG. 4, interacting with the virtual shower's faucet may turn the virtual shower "on." In such an embodiment, when the virtual shower is on the computing device 401 may display virtual water running from the virtual shower head and output an associated haptic effect. For example, the computing device 401 may output a haptic effect comprising a light vibration via the housing of the computing device 401 to simulate the feel of running water.

In some embodiments, the computing device 401 may be configured to be worn on the user's head or face, for example, as a helmet or glasses. In some embodiments, the computing device 401 may comprise a display 402, for example, a head-mounted display (HMD). In some embodiments, the display 402 may be transparent. Further, the computing device 401 comprises an augmented reality application. The augmented reality application may output a virtual object on the display 402. In some embodiments, upon the occurrence of an event, the computing device 401 may output a haptic effect, for example, a vibration or a remote haptic effect (e.g., via a wearable device or a puff of gas). For example, in some embodiments, the computing device 401 may comprise a helmet. The helmet may comprise a camera positioned to capture images in front of or behind the user. The computing device 401 may output the camera images to a display 402. Further, in some embodiments, the computing device 401 may output a virtual object (e.g., a virtual shower 404) overlaying the camera images. In some embodiments, upon the user interacting with the area in real space associated with the virtual object, the computing device 401 may output a haptic effect associated with the interaction. For example, upon the user touching an area in real space associated with the virtual object, the computing device 401 may output a haptic effect comprising, for example, a puff of gas toward the user's finger. Additional examples of a head-mounted display may be found in U.S. patent application Ser. No. 14/106,275, which claims priority to U.S. Provisional Patent Application No. 61/909,797, the entirety of both of which is hereby incorporated by reference herein.

Figure 5:
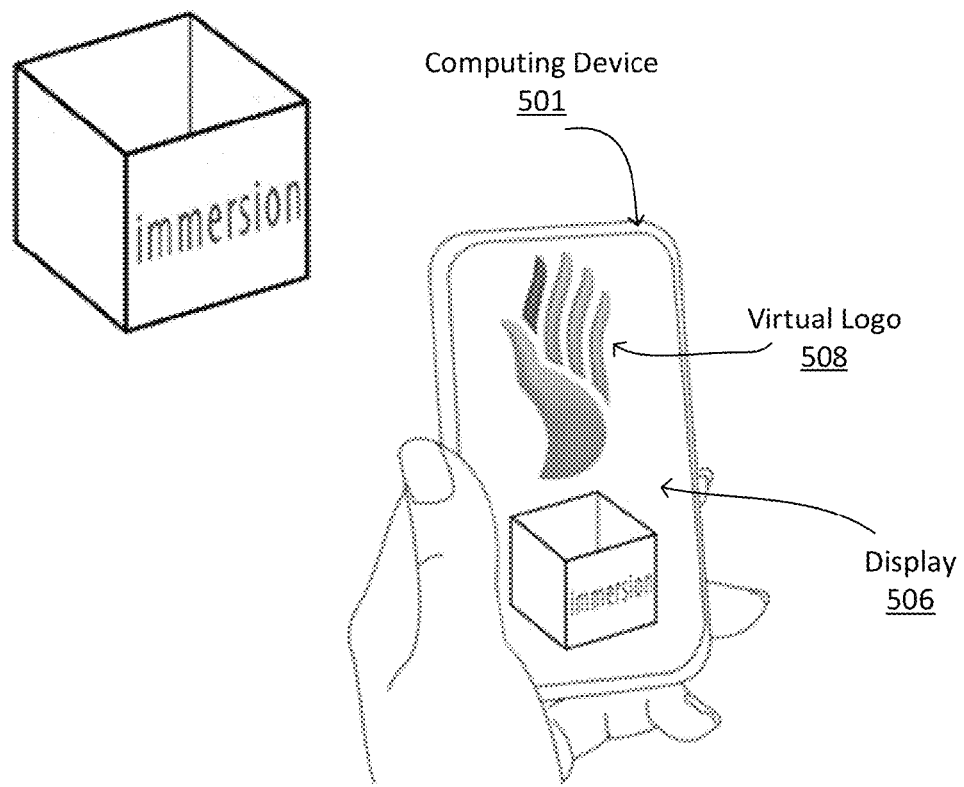
FIG. 5 shows a system for viewport-based augmented reality haptic effects according to another embodiment.

FIG. 5 shows a system for viewport-based augmented reality haptic effects according to another embodiment. In this example, the system comprises a computing device 501, which comprises a smartphone with a display 506.

Computing device 501 comprises a camera (not shown) positioned on the back of the computing device 501. In this example, the user has pointed the camera toward a box with a company name on it, and computing device 501 is outputting data from the camera associated with the box on the display 506. Computing device 501 further comprises an augmented reality application. In the embodiment shown in FIG. 5, the augmented reality application analyzes the camera data and determines if data associated with a company, e.g., the company's logo, name or products, is present. If data associated with the company is present, the augmented reality application outputs a virtual object associated with the company. For example, the augmented reality application may output a virtual logo associated with the company. A virtual logo may comprise a 2D or 3D representation of the company's logo.

In the embodiment shown in FIG. 5, the augmented reality application has analyzed the data associated with the box, determined the Immersion company name is present, and is outputting a virtual logo 508 comprising the Immersion logo. In other embodiments, the augmented reality application may analyze a product (e.g., a car, hat, phone, computer, tablet, furniture, or clothing), determine a company associated with a product (e.g., Maserati®), and output a virtual logo 508 associated with the company. For example, in some embodiments, the application may detect certain product features (e.g., the size, shape, color, and/or material of the product) and/or a logo on the product to determine a company associated with the product.

In some embodiments, computing device 501 may output different types of haptic effects based on the virtual object and/or in response to different events. In some embodiments, computing device 508 may output the haptic effects immediately upon the display of the virtual logo 508 or after a certain time delay (e.g., after two minutes, or repeatedly every two minutes). In other embodiments, computing device 501 may output a haptic effect (e.g., a vibration, a texture, or a change in a perceived coefficient of friction) when a user touches the location on the display 506 comprising the virtual logo 508.

In some embodiments, a user may be able to reach out and touch the location in real space associated with the location of the virtual logo 508. In response, computing device 501 may output a remote haptic effect, for example, a puff of gas, a concentrated pressure wave, or by activating a haptic output device coupled to a wearable device. In some embodiments, computing device 501 may additionally or alternatively output a local haptic effect, for example, by vibrating the housing of the computing device 501. In some embodiments, haptic effects may provide confirmation of a user input or provide greater interactivity with the virtual logo 508.

In some embodiments, computing device 501 may output a haptic effect associated with the company's product or brand. For example, a company may associate a certain haptic effect or series of haptic effects with a particular product or brand. In some embodiments, upon a user interacting with a company's virtual logo 508, the computing device 501 may output a haptic effect associated with the company. For example, in some embodiments, Immersion may associate with its brand a haptic effect comprising three short pulsed vibrations. Upon a user interacting with Immersion's virtual logo 508, computing device 501 may determine and output this haptic effect. In some embodiments, determining the haptic effect may comprise accessing a local and/or remote database of haptic effects associated with logos.

Figure 6:
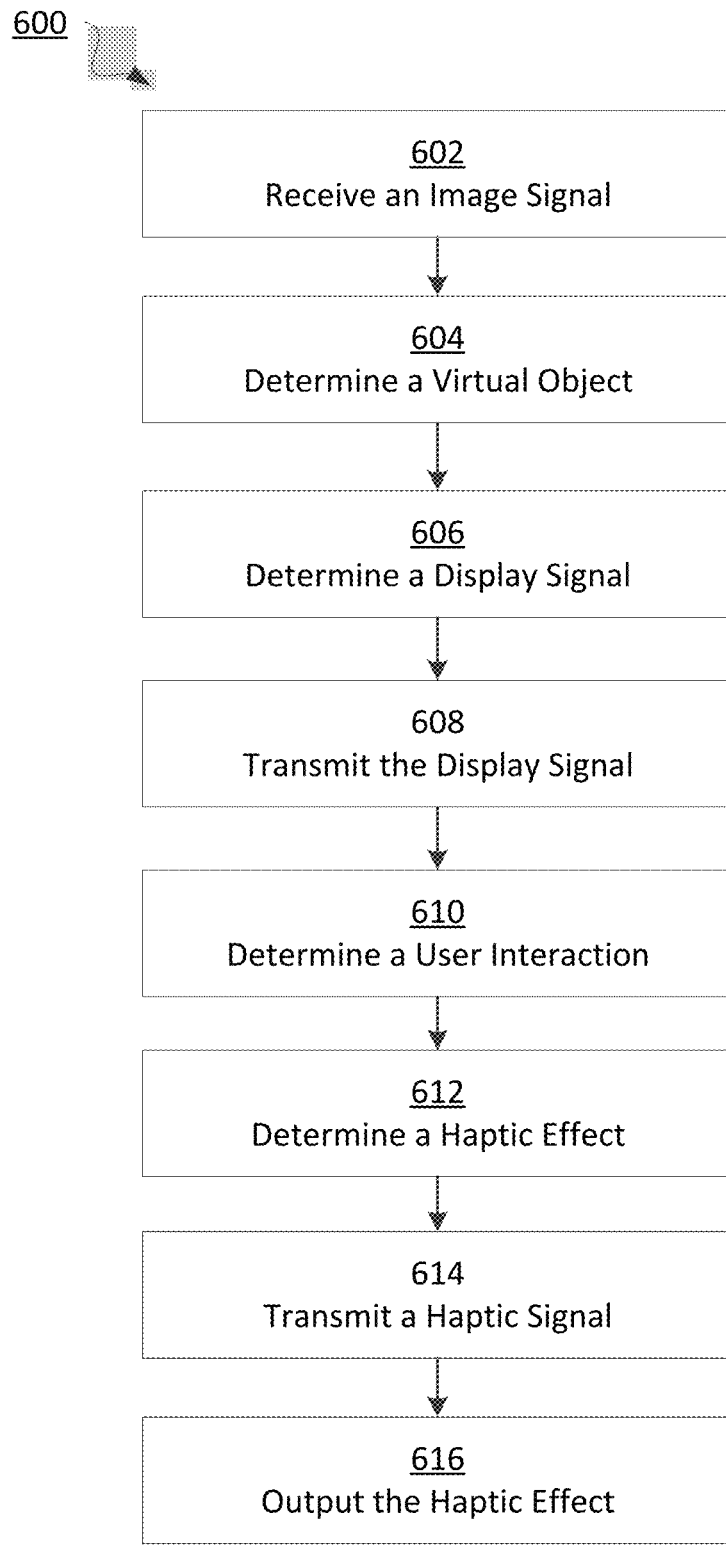
FIG. 6 is a flow chart of steps for performing a method for providing viewport-based augmented reality haptic effects according to one embodiment.

Illustrative Methods for Providing a Viewport-Based Augmented Reality Haptic Effect FIG. 6 is a flow chart of steps for performing a method for providing viewport-based augmented reality haptic effects according to one embodiment. In some embodiments, the steps in FIG. 6 may be implemented in program code that is executed by a processor, for example, the processor in a general purpose computer, a mobile device, or a server. In some embodiments, these steps may be implemented by a group of processors. In some embodiments one or more steps shown in FIG. 6 may be omitted or performed in a different order. Similarly, in some embodiments, additional steps not shown in FIG. 6 may also be performed. The steps below are described with reference to components described above with regard to system 100 shown in FIG. 1.

The method 600 begins at step 602 when processor 102 receives an image signal. The image signal may be associated with data from a camera 130 (e.g., an area image of the field of view of the camera 130). For example, in some embodiments, the image may comprise an image of a city street. In such an embodiment, the image may comprise features commonly found on a city street (e.g., building, cars, street signs, or people).

The method 600 continues at step 604 when processor 102 determines a virtual object (e.g., a virtual automobile, avatar, or piece of furniture) based in part on the image signal. In some embodiments, the virtual object may comprise data associated with the image captured by the camera 130. For example, in some embodiments, the virtual object may comprise data associated with a store or restaurant in the image. In such an embodiment, the virtual object may comprise the menu of a restaurant in the image.

The method 600 continues at step 606 when processor 102 determines a display signal based in part on the image signal. The display signal comprises data associated with a virtual object. In some embodiments, the display signal comprises virtual object data overlaying the image captured by the camera 130. For example, in some embodiments, the display signal may comprise menu data overlaying the restaurant in the image captured by the camera 130.

The method 600 continues at step 608 when processor 102 transmits the display signal to a display. The display is configured to output an image associated with the display signal. For example, the display may output an image comprising menu data overlaying the image of a restaurant.

The method 600 continues at step 610 when the processor 102 determines a user interaction with a virtual object. In some embodiments, the processor 102 may determine, via signals from sensor 108, a user interaction on the surface of touch sensitive surface 116 at a location associated with a virtual object. For example, in some embodiments, the processor 102 may determine a user interaction with a virtual object (e.g., a virtual menu) if the user taps a finger on the touch sensitive surface 116 at a location associated with the virtual object. In some embodiments, the processor 102 may determine a user interaction (e.g., tilting or moving the computing device) via signals from sensors 132. For example, in some embodiments, processor 102 may determine a user interaction upon the user touching a point in real space associated with a virtual object (e.g., a point in real space associate with a virtual car).

The method 600 continues at step 612 when processor 102 determines a haptic effect. In some embodiments, the processor 102 may determine the haptic effect based at least in part on one or more of: the virtual object, the image signal from the camera 130, an event, or a haptic profile. In some embodiments, the processor 102 may rely on programming contained in haptic effect determination module 126 to determine the haptic effect. In some embodiments, haptic effect determination module 126 may comprise a lookup table. In some embodiments, processor 102 may use the lookup table to associate events with particular haptic effects (e.g., textures).

For example, in one embodiment, the event is based on game activity (e.g., a gunshot, a level completion, or an explosion). In such an embodiment, the augmented reality application may output a virtual object (e.g., a virtual car) that the user can control to complete certain objectives (e.g., successfully navigating the car around a pedestrian). As the user completes objectives, the computing device 101 may determine associated haptic effects.

In some embodiments, users may have "haptic profiles" wherein a user can determine and save in memory 104 a "profile" of the haptic effects the user would like associated with particular events. For example, in one embodiment, a user can select from a list of available haptic effects and associate one of these haptic effects with a virtual object output by the augmented reality application. In some embodiments, the list may comprise, for example, haptic effects such as a puff of air, an intense vibration, a light vibration, or textures such as bumpy, rubbery, or smooth. In some embodiments, the processor 102 may consult with the user's haptic profile to determine which haptic effect to generate. For example, if the user's haptic profile associates interaction with a virtual object with an intense vibration, in response to the user placing a finger on a touch screen display over the virtual object, the processor 102 may determine a haptic effect comprising an intense vibration.

The method 600 continues at step 614 when processor 102 transmits a haptic signal to the haptic output device 118. The haptic signal is based at least in part on the haptic effect. In some embodiments, the processor 102 may access drive signals stored in memory 104 and associated with particular haptic effects. In one embodiment, a signal is generated by accessing a stored algorithm and inputting parameters associated with an effect. For example, in such an embodiment, an algorithm may output data for use in generating a drive signal based on amplitude and frequency parameters. As another example, a second haptic signal may comprise data sent to an actuator to be decoded by the actuator. For instance, the actuator may itself respond to commands specifying parameters such as amplitude and frequency.

The method 600 continues at step 614 when haptic output device 118 outputs the haptic effect. Haptic output device 118 receives the haptic signal and outputs the haptic effect. In some embodiments, the haptic effect comprises a vibration, a change in a perceived coefficient of friction, a simulated texture, a surface deformation, a concentrated pressure wave, and/or a puff of a solid, liquid, gas, or plasma.

Figure 7:
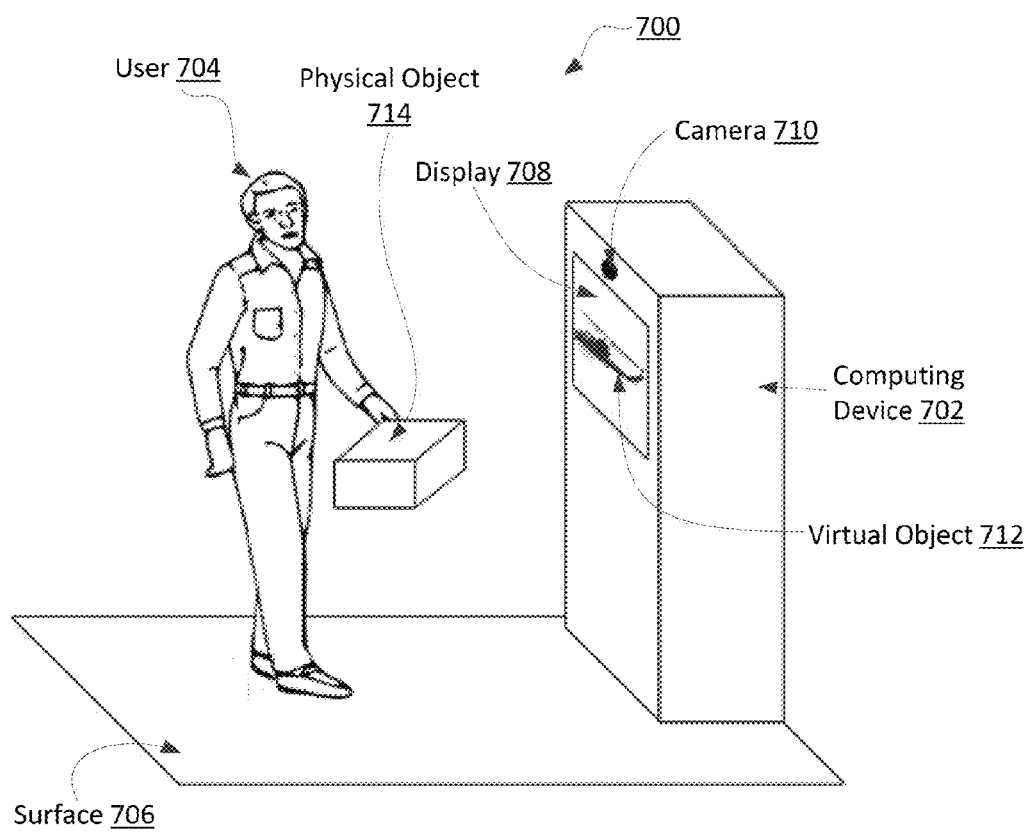
FIG. 7 shows a system for viewport-based augmented reality haptic effects according to another embodiment.

Additional Embodiments of Systems for
Viewport-Based Augmented Reality Haptic Effects FIG. 7 shows a system for viewport-based augmented reality haptic effects according to another embodiment. In this example, the system 700 comprises a computing device 702 positioned on a surface 706 (e.g., the floor). The computing device 702 comprises a display 708 and a camera 710. In this example, the computing device 702 comprises a kiosk.

The computing device 702 further comprises an augmented reality application. In some embodiments, the augmented reality application may be configured to generate a virtual object 712 associated with a user 704. In some embodiments, the augmented reality application may be configured to generate a virtual object 712 associated with a physical object 714 (e.g., a box, book, wand, card, block, cube, smartphone, chair, or pen) external to the computing device 702. For example, in some embodiments, a user 704 may be holding the physical object 714. The computing device 702 may detect the physical object 714 (e.g., via the camera 710) and/or determine a characteristic of the physical object 714. In some embodiments, the computing device 702 may generate a virtual object 712 based on the determined characteristic.

In some embodiments, the physical object 708 may comprise a haptic output device in communication with the computing device 702. Upon the occurrence of an event, the computing device 702 may output a haptic effect to the user 704 via the physical object 714. For example, in some embodiments, the user may be holding the physical object 714 (e.g., a wand) in front of the camera 710. The physical object 714 may comprise a haptic output device. The computing device 702 may comprise an augmented reality application configured to generate a virtual object (e.g., sparkles emitted from the end of the wand) associated with the physical object 714. In some embodiments, upon the occurrence of an event (e.g., the user shaking the wand) the computing device 702 may further output a haptic effect (e.g., a vibration) via the physical object 714.

For example, in some embodiments, the user 704 may be holding a physical object 714 comprising, for example, a card. The card may comprise a haptic output device in communication with the computing device 702. Upon the occurrence of an event, the computing device 702 may output a haptic effect via the card. For example, the user 704 may position the card in front of the camera 710. The computing device 702 may comprise an augmented reality application configured to generate a virtual object 712 positioned on top of the card. For example, in some embodiments, the augmented reality application may generate a virtual car positioned on top of the card. As the user 704 interacts with the virtual car (e.g., by opening or closing the car's virtual doors or turning on the car's virtual engine), the computing device 702 may output a haptic effect to the user via the haptic output device in the card. For example, the haptic effect may be configured to simulate the opening or closing of a car door, or the rumbling of a car's engine.

Further, in some embodiments, a user 704 may contact a surface 706 (e.g., a floor, desk, chair, or table) that is external to computing device 702. In some embodiments, upon the occurrence of an event, the computing device 702 may output a haptic effect to the user 704 via the surface 706. For example, in some embodiments, the computing device 702 may output a haptic effect configured to vibrate, tilt, or move the surface 706 that the user 704 is contacting (e.g., on which the user 704 is standing or sitting). In some embodiments, the surface 706 may comprise a haptic output device in communication with the computing device 702. The computing device 702 may output haptic effects via the haptic output device. In other embodiments, the computing device 702 may output haptic effects (e.g., vibrations) that propagate through the surface 706 such that the user 704 may perceive the haptic effect. For example, in some embodiments, the physical object 714 may comprise a book and the computing device 702 may comprise, for example, a kiosk, television, computer, or game system. The user 704 may be holding the book in front of a camera 710. In some embodiments, the computing device 702 may comprise an augmented reality application configured to generate a virtual object 712 associated with the book, for example, a virtual character associated with the book. In some embodiments, upon the user 704 interacting with the virtual character, the computing device 702 may output a haptic effect via a surface 706, for example, the floor on which the user 704 is standing. For example, in some embodiments, the computing device 702 may vibrate the floor such that the user 704 may perceive the haptic effect.

Further, in some embodiments, the computing device 702 may analyze camera data and determine information associated with the physical object 714 (e.g., its manufacturer, size, shape, contents, color, or orientation). In some embodiments, the computing device 702 may output a haptic effect based on the determined information. For example, in some embodiments, a user 704 may hold a physical object 714 comprising for example, a toy box in front of a camera 710 associated with the computing device 702. The computing device 702 may determine information associated with the toy box, for example, that the toy box contains a toy helicopter. In some embodiments, the computing device 702 may comprise an augmented reality application configured to generate a virtual object 712 associated with the physical object 714, for example, a 3D model of the toy within the toy box (e.g., the toy helicopter). Further, in some embodiments, the computing device 702 may output a haptic effect based on the determined information. For example, in the embodiment above in which the physical object comprises a toy helicopter, the computing device 702 may output a haptic effect comprising a low rumbling vibration configured to simulate a helicopter in flight. In some embodiments, the computing device 702 may output the haptic effect via the surface 706 on which the user 704 is standing. In other embodiments, the computing device 702 may output the haptic effect via a haptic output device within the toy box.

Advantages of a Viewport-Based Augmented Reality Haptic Effect

There are numerous advantages of having viewport-based augmented reality haptic effects. Providing haptic feedback as users interact with a virtual object via an augmented reality application may allow the user to more realistically perceive aspects of the virtual object, thereby increasing overall user satisfaction. For example, in some embodiments, an augmented reality application may output a virtual tiger overlaying camera data. Upon the occurrence of an event, such as the user moving a finger across a touch screen display area associated with the virtual tiger, the computing device may output a texture simulating fur. As a result, the user may perceive the virtual tiger as more realistic.

Further, adding haptic feedback to viewport-based augmented reality may lead to improved marketing for brands. For example, in some embodiments, an augmented reality application may output a virtual object comprising, for example, a company logo and, upon the occurrence of an event, output haptic feedback associated with the logo. This may cause the user to identify a haptic effect with a brand, strengthening the brand. Further, such embodiments may provide a more immersive and enhanced marketing experience.

In some embodiments, viewport-based augmented reality haptic effects may provide a confirmation to a user. For example, in some embodiments, an augmented reality application may output a virtual object comprising a button. As a user interacts with a location in real space associated with the button, the computing device may output a haptic effect (e.g., a concentrated pressure wave) to the back of the user's finger, thereby confirming a button press. In some embodiments, confirmatory haptic feedback may provide an enhanced user experience.

In some embodiments, adding haptic feedback to viewport-based augmented reality may provide additional information to a user. For example, in some embodiments, an augmented reality application may output a virtual object comprising a motorcycle. The user may be able to switch motorcycle models by swiping a finger across the display screen. Upon switching motorcycle models, in some embodiments, the augmented reality application may output a vibration with a magnitude and/or duration based on the horsepower of the engine in the presently-displayed motorcycle model. Thus, a user may perceive additional information about the virtual object (e.g., virtual motorcycle) as a result of the haptic effects.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may comprise computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
    a processor in communication with an image capture device;
    a memory comprising program code that is executable by the processor to cause the processor to:
        receive an image of a physical object from an image capture device;
        identify the physical object in the image;
        determine information about the physical object;
        determine a virtual object based on the information about the physical object, wherein the virtual object is different from a virtual representation of the physical object;
        cause a display device to display an augmented reality environment having the virtual object;
        detect an event in the augmented reality environment, wherein the event is associated with the virtual object; and
        cause a haptic output device to output a haptic effect based on the event.

2. The system of claim 1, wherein the information about the physical object comprises a make, model, manufacturer, or contents of the physical object.

3. The system of claim 2, wherein the information about the physical object comprises the contents of the physical object, and wherein the virtual object is a virtual representation of the contents of the physical object.

4. The system of claim 1, wherein the information about the physical object comprises a company related to the physical object.

5. The system of claim 4, wherein the virtual object comprises a logo of the company related to the physical object.

6. The system of claim 1, wherein the memory further comprises program code that is executable by the processor to cause the processor to output another haptic effect indicating the information about the physical object.

7. The system of claim 1, wherein the augmented reality environment is configured to have the virtual object positioned on a virtual representation of a body part.

8. The system of claim 7, wherein the event comprises a movement of the virtual object along the virtual representation of the body part in the augmented reality environment.

9. A method comprising:
    receiving, by a processor, an image of a physical object from an image capture device;
    identifying, by the processor, the physical object in the image;
    determining, by the processor, information about the physical object;
    determining, by the processor, a virtual object based on the information about the physical object, wherein the virtual object is different from a virtual representation of the physical object;
    causing, by the processor, a display device to display an augmented reality environment having the virtual object;
    detecting, by the processor, an event in the augmented reality environment, wherein the event is associated with the virtual object; and
    causing, by the processor, a haptic output device to output a haptic effect based on the event.

10. The method of claim 9, wherein the information about the physical object comprises a make, model, manufacturer, or contents of the physical object.

11. The method of claim 10, wherein the information about the physical object comprises the contents of the physical object, and wherein the virtual object is a virtual representation of the contents of the physical object.

12. The method of claim 9, wherein the information about the physical object comprises a company related to the physical object, and wherein the virtual object comprises a logo of the company related to the physical object.

13. The method of claim 9, further comprising output another haptic effect indicating the information about the physical object.

14. The method of claim 9, wherein the augmented reality environment is configured to have the virtual object positioned on a virtual representation of a body part, and wherein the event comprises a movement of the virtual object along the virtual representation of the body part in the augmented reality environment.

15. The method of claim 9, wherein the haptic output device is coupled to an article configured to be worn by a user.

16. A non-transitory computer-readable medium comprising program code that is executable by a processor to cause the processor to:
receive an image of a physical object from an image capture device;
identify the physical object in the image;
determine information about the physical object;
determine a virtual object based on the information about the physical object, wherein the virtual object is different from a virtual representation of the physical object;
cause a display device to display an augmented reality environment having the virtual object;
detect an event in the augmented reality environment, wherein the event is associated with the virtual object; and
cause a haptic output device to output a haptic effect based on the event.

17. The non-transitory computer-readable medium of claim 16, wherein the information about the physical object comprises a make, model, manufacturer, or contents of the physical object.

18. The non-transitory computer-readable medium of claim 16, wherein the information about the physical object comprises the contents of the physical object, and wherein the virtual object is a virtual representation of the contents of the physical object.

19. The non-transitory computer-readable medium of claim 16, wherein the information about the physical object comprises a company related to the physical object, and wherein the virtual object comprises a logo of the company related to the physical object.

20. The non-transitory computer-readable medium of claim 16, wherein the augmented reality environment is configured to have the virtual object positioned on a virtual representation of a body part, and wherein the event comprises a movement of the virtual object along the virtual representation of the body part in the augmented reality environment.

* * * * *